(No Model.)
S. UREN.
PROCESS OF UTILIZING SCRAP FOR THE MANUFACTURE OF NUTS, &c.
No. 327,743. Patented Oct. 6, 1885.
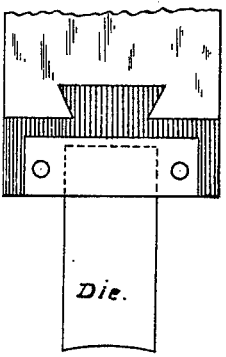
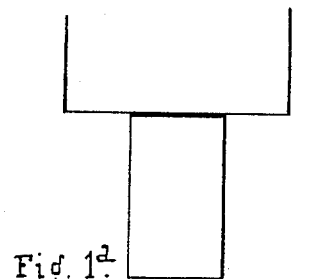
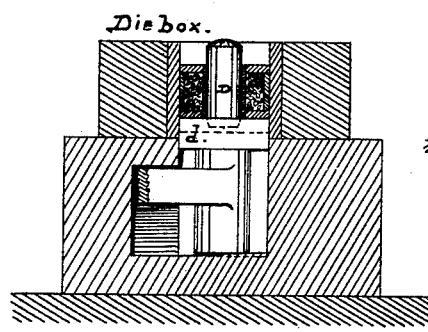
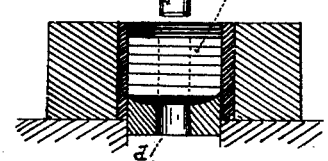
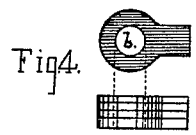
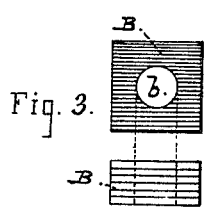
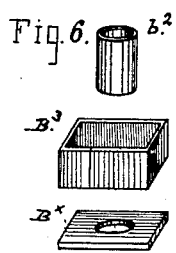
Witnesses:
Edwin N. McKee
W. L. Penning
Inventor:
Stephen Uren
By his Atty.,

UNITED STATES PATENT OFFICE.

STEPHEN UREN, OF SACRAMENTO, CALIFORNIA.

PROCESS OF UTILIZING SCRAP FOR THE MANUFACTURE OF NUTS, &c.

SPECIFICATION forming part of Letters Patent No. 327,743, dated October 6, 1885.

Application filed November 28, 1884. Serial No. 149,074. (No model.)

*To all whom it may concern:*

Be it known that I, STEPHEN UREN, a citizen of the United States, residing in the city and county of Sacramento, in the State of California, have invented certain new and useful Improvements in Utilizing Waste and Refuse Metal Plate and Scrap in the Manufacture of Nuts and other Articles; and I do hereby declare that the following is a full, clear, and exact description of my said invention, reference being had to the drawing that accompanies and forms a part of this specification.

My invention has for its object to utilize much of the waste wrought metal that in the form of old boiler-plates, strap-iron, cuttings from metal plates, and pieces of sheet metal, both old and new, has heretofore been consigned to the scrap-heap and the furnace as the only mode of converting the metal to use; and it consists in a certain novel method or process of working up such waste metal directly into nuts, collars, rings, eyes for crank-pin rods, and other articles and parts of machinery whose simplicity of form adapts them to this improved manufacture.

Nuts for bolts and many other staple articles and parts have heretofore been produced in quantities by cutting, punching, or pressing them out, the material being furnished in the form of bars or rods or in lengths of a shape approximating to that of the article in cross-section or as would be calculated to give as little waste as possible, this material in some practices being brought to the general form or outline between rolls, and furnished in such form ready to be cut, punched, and otherwise finished; and in all these practices and methods, so far as known to me, the manufacture has been carried on from new solid material. I have discovered, however, that many such articles and parts of machines can be produced directly from waste sheet-metal plate and other material of comparatively useless forms by first making from pieces of material a pile in the shape or form of the article, or approaching closely to its form, then bringing this pile to a welding heat, and finally subjecting it to a suitable pressure, or the action of a drop-press within a die-box having the shape of the finished article. By such means much waste metal is rendered available for direct conversion, and the products, whether finished articles or blanks, can be supplied at greatly reduced cost, as there is both a reduction in the labor and a considerable difference in the value of the waste scrap or residue as compared with the process of manufacturing from new material, as before mentioned.

To apply, carry out, and practice my improvement in the manufacture of nuts or blanks for nuts, I proceed substantially as follows, it being understood that I describe the manner of producing such article of general consumption, because it illustrates the *modus operandi* and will clearly show to one skilled in the art the adaptability of the invention to other similar forms and articles in which an eye or aperture is required; for many other articles and parts—such as rings, collars, and eyes for crank-pin connections—can be produced in the same manner by simply changing the form of the die and head or plunger to correspond with the shape required in the case of each article.

Referring to the accompanying drawings, Figures 1 and 1ª represent in cross-section a construction of die-box and devices employed by me in the manufacture of nut-blanks according to my invention. Fig. 2 shows parts of this mechanism in detail. Fig. 3 shows the form of pile for producing nut-blanks. Figs. 4 and 5 show other forms of piles. Fig. 6 illustrates the mode of utilizing small scraps in the production of a nut.

To produce blanks for the manufacture of nuts for bolts, I proceed to cut up the material at hand—such as old boiler-plates, strap-iron, and metal plates—by means of a suitable die, punch, or cutting-tool, and with as little waste as possible to produce a quantity of blank slabs or plates, B, of the size or sizes corresponding with the dimensions of the nut, and each with a central hole or aperture, *b*. A number of these slabs or plates of equal size are laid closely and evenly together with edges true and the center openings in line together, the number to be used being regulated both by their thickness and that of the nut to be produced. The pile thus formed is then brought up to a welding heat in a suitable furnace, and in this condition is immediately introduced under a drop-press, where by a single blow the pile is brought into shape and solid form. For this last part of the operation I employ a close die-box, having a cavity of the required shape and depth, with a head or plunger fitted to it, the die being fixed on the bed of the press and the plunger secured to the drop or hammer by which the blow is given.

To preserve the form and size of the eye or aperture, a metal pin, D, is inserted in upright position into the hole in the pile, when it is dropped in its heated state into the die, and the head or plunger has a hole in the end to let in as much of the pin D as may extend above the pile. A socket should be provided also in the bottom of the die-box for the end of the pin, so that it shall be centered and its upright position insured as the die or plunger is brought down over the pile. For carrying on this operation rapidly it is better to have a die-box with a loose drop-bottom for discharging the article as soon as it is brought into solid form, and then by providing several bottom blocks or drops and the necessary center pins or cores, to produce the hole or eye, the die can be charged with heated piles in succession as rapidly as the movement of the plunger will permit. A die-box of such form is illustrated in Fig. 1 of the drawings. The drop-bottom is held up by a swinging post or support which is drawn from under the bottom to discharge the finished article into the open space under the die-box. This construction is fully described in a separate application for Letters Patent made by me, Serial No. 148,996.

In Figs. 1 and 6 I illustrate a mode of forming the pile for a large-size nut from small scraps, clippings, and other pieces too small for other use. In this case I produce a shell by laying a slab or plate, B*, for a base, then setting up right into its eye or aperture a piece of tube, $b^2$, of required length, according to the thickness of the nut or article to be produced, and around the edge of the bottom plate setting a rectangular frame, $B^3$, produced by bending up a strip of iron to form the four sides. Finally fitting in the space between these sides and the upright tube in it the small chips and pieces of metal, I place a second slab or plate, B**, upon the top as a cover. This pile is then heated in the same manner as the structure before described, and in the heated condition is introduced into the die-box, the center pin, D, being employed to properly form the eye or aperture.

By either of these modes I form a pile, and by a single heat and the action of a drop-press I am able to bring it into a solid body and the required shape.

Other forms—such as shown in Figs. 4 and 5—would require a die-box and head or plunger to correspond, and so for these or any other form of blanks or finished article the plates or pieces of which the pile is built are cut from the waste material into the required outline.

Many blanks and forms heretofore punched, cut, or pressed out of solid material, and especially those furnished in quantities to supply the market, could be manufactured from such waste material satisfactorily and economically by my improvement, as it will require only the intelligence of the mechanic familiar with such art and practices to apply it and use it.

It is obvious that the same result can be produced with the positions of the center pin or core and the socket reversed—that is, by fixing the pin in the head of the plunger and having a socket provided in the bottom of the die-box for it to enter, as clearly shown in Fig. 1$^a$ of the drawings.

Having thus fully described my invention, what I claim, and desire to secure by Letters Patent, is—

1. The method of utilizing wrought-metal scrap and such waste material, as herein described, in the manufacture of nuts for bolts and like forms and articles, which consists in cutting the waste material into slabs or plates having or approaching to the outline of the blank or article, in producing a pile from such slabs or plates, in heating the pile, and then introducing it while in this condition into a die-box of suitable shape and applying pressure to it by means of a die-head or plunger fitted to the die-box, substantially as herein set forth.

2. The herein-described method or process of manufacturing nut-blanks for bolts and other articles and forms, consisting in forming a pile of the shape and outline, or approximating to the shape and outline of the article, from scraps of the waste metal, then heating the pile to welding-heat, and then subjecting it to pressure or the action of a drop-press while confined in a die-box the cavity of which has the form of the blank or article to be produced, substantially as set forth.

3. In the process of manufacturing from scrap material nut-blanks and other articles having an eye or aperture through them, the method or process of producing and fixing such eye or aperture, which consists in providing an aperture in the parts or pieces of which the pile is formed, and then inserting a pin or plug into the aperture of the pile after the heating operation and before pressure, substantially as set forth.

STEPHEN UREN. [L. S.]

Witnesses:
EDWIN H. McKEE,
W. L. BENING.